United States Patent
Tong et al.

(10) Patent No.: US 10,262,262 B2
(45) Date of Patent: Apr. 16, 2019

(54) SEMANTIC METHOD FOR TERMINAL DEVICES OF INTERNET OF THINGS

(71) Applicant: SHENYANG INSTITUTE OF AUTOMATION OF THE CHINESE ACADEMY OF SCIENCES, Liaoning (CN)

(72) Inventors: Xing Tong, Liaoning (CN); Yang Liu, Liaoning (CN); Zhao Shi, Liaoning (CN); Peng Zeng, Liaoning (CN); Haibin Yu, Liaoning (CN)

(73) Assignee: SHENYANG INSTITUTE OF AUTOMATION OF THE CHINESE ACADEMY OF SCIENCES, Liaoning (CN)

( * ) Notice: Subject to any disclaimer, the term of this patent is extended or adjusted under 35 U.S.C. 154(b) by 840 days.

(21) Appl. No.: 14/778,406

(22) PCT Filed: Dec. 20, 2013

(86) PCT No.: PCT/CN2013/090034
§ 371 (c)(1),
(2) Date: Sep. 18, 2015

(87) PCT Pub. No.: WO2015/085622
PCT Pub. Date: Jun. 18, 2015

(65) Prior Publication Data
US 2016/0292571 A1    Oct. 6, 2016

(30) Foreign Application Priority Data

Dec. 10, 2013    (CN) .......................... 2013 1 0669226

(51) Int. Cl.
*G06N 5/02*    (2006.01)
*H04L 29/08*    (2006.01)
(Continued)

(52) U.S. Cl.
CPC ............... *G06N 5/02* (2013.01); *G06F 17/28* (2013.01); *G06F 17/30734* (2013.01);
(Continued)

(58) Field of Classification Search
None
See application file for complete search history.

(56) References Cited

U.S. PATENT DOCUMENTS

| 9,454,730 B2* | 9/2016 | Flinn ...................... G06N 5/048 |
| 2015/0227268 A1* | 8/2015 | Rathod ............. G06F 17/30867 715/739 |
| 2018/0128021 A1* | 5/2018 | Akagi ..................... E05B 77/26 |

FOREIGN PATENT DOCUMENTS

| CN | 101661513 A | 3/2010 |
| CN | 102523200 A | 6/2012 |

(Continued)

OTHER PUBLICATIONS

Suparna De et al., An Internet of Things Platform for Real-World and Digital Objects, Scalable Computing: Practice and Experience, vol. 13, No. 1, pp. 45-57 (Year: 2012).*

(Continued)

*Primary Examiner* — Alan Chen
(74) *Attorney, Agent, or Firm* — Smith, Gambrell & Russell, LLP (57) ABSTRACT

The present invention relates to the technical field of terminal devices of the Internet of Things, more specifically to a semantic method for terminal devices of the Internet of Things capable of analyzing the application characteristics of terminal devices of the Internet of Things, setting down the rules for building ontology base; analyzing and building initial ontology base by using the ontology base building tool; pre-processing information from network and sensors; collecting information uploaded by sensors, updating the initial ontology base, and expanding the ontology base by (Continued)

collecting information searched by network. The method establishes program plan by object-oriented mode, analyzes implementing results by using existing test data or simulated data, and realizes domain updating and expansion of sensor ontology according to specific applications. The whole development and evolution of sensor ontology is increasing gradually in a spiral form.

16 Claims, 5 Drawing Sheets

(51) Int. Cl.
    *G06F 17/28*     (2006.01)
    *G06F 17/30*     (2006.01)
    *H04W 4/70*     (2018.01)

(52) U.S. Cl.
    CPC ............. *G06N 5/022* (2013.01); *H04L 67/12* (2013.01); *H04W 4/70* (2018.02)

(56) References Cited

FOREIGN PATENT DOCUMENTS

| CN | 102880617 A | 1/2013 |
|---|---|---|
| CN | 103327080 A | 9/2013 |

OTHER PUBLICATIONS

Zhou et al., A Web Service Discovery Computational Method for IOT System, Proceedings of IEEE CCIS2012, pp. 1009-1012 (Year: 2012).*
Hachem et al., Ontologies for the Internet of Things, MDS'2011, Lisbon, Portugal, 6 pages total (Year: 2011).*
Yu-dong et al., A Web based Framework for Developing Domain Ontology, IEEE computer society, pp. 305-308 (Year: 2010).*
Bowers et al., A Conceptual Modeling Framework for Expressing Observational Data Semantics, Springer-Verlag Berlin Heidelberg, pp. 41-54 (Year: 2008).*
International Search Report for PCT/CN2013/090034, dated Sep. 2, 2014 in English & Chinese Language.
Chinese Search Report for Chinese Patent App. No. 201310669226.6 dated May 25, 2017 (2 pages).
First Chinese Office Action for Chinese Patent App. No. 201310669226.6 dated Jun. 8, 2017 (6 pages in Chinese, and English Translation).
Written Opinion of the International Searching Authority for International Patent App. No. PCT/CN2013/090034 dated Sep. 2, 2014 (6 pages in Chinese, and English Translation).
International Preliminary Report on Patentability for International Patent App. No. PCT/CN2013/090034 dated Jun. 14, 2016 (5 pages in Chinese, and English Translation).

* cited by examiner

SEMANTIC METHOD FOR TERMINAL DEVICES OF INTERNET OF THINGS

TECHNICAL FIELD

The present invention relates to the technical field of terminal devices of the Internet of Things, more specifically to a semantic method for terminal devices of the Internet of Things.

DESCRIPTION OF RELATED ART

The Internet of Things is a network concept for information exchange and communication by extending and expanding the user end between any object and object based on the concept of the Internet. Specifically, any object is interconnected with the Internet by means of radio frequency identification (RFID), infrared sensor, global positioning system (GPS), laser scanner and other information sensing devices, according to agreed protocols, for information exchange and communication so as to realize a network concept of intellectual identification, positioning, tracking, monitoring and management.

Information semantization, as the basis of the Internet of Things, is put forward in consideration of problems such as information disorder in the current Internet of Things, data lacking in semantics and low information acquisition efficiency. In a semantic Web, information is given explicit meaning that enables a computer to understand and identify Web information, explain, exchange and process it automatically, in this way to provide people with excellent services. The semantic Web, by using the tag format defined by XML, flexibly describes data via RDF and describes the explicit meaning of terms in web files by OWL language and their relationship.

Ontology is the core of semantics. It mainly aims at acquiring words representing the domain as commonly recognized by obtaining related domain knowledge, and the hierarchical structure of these words so as to realize common understanding to domain knowledge.

However, the sensor ontology, no matter as a common language or a data model, lacks semantics on time and space. For instance, the number "25" obtained from a temperature sensor, when marked by "temperature" in the sensor ontology, indicates a temperature of "25", but the ontology is unable to indicate the collecting time, place and person, and other related information.

On the other hand, the ontology developer builds corresponding sensor ontology according to particular applications without explicit meaning and unified framework, which causes different class definitions in various ontologies, further leading to poor accessibility and reusability of each other. In the face of the development of sensor ontology, there is no complete, mature building method. Currently, common ontology building methods include the skeleton method, methontology method, IDEF5, evaluation method and seven-step process, but these are not suitable for the building of sensor ontology. First of all, they are sorted out from domain ontology building methods and they are imperfect in themselves, for example, their building processes are not standard, and they lack planning, demand analysis process, consideration of ontology expansibility, sufficient guarantee of accessibility and reusability of ontology, and unified evaluation standard.

BRIEF SUMMARY OF THE INVENTION

To achieve large-scaled and standardized development of ontology, and improve the development quality of sensor ontology, on the basis of the building principles of sensor ontology and the characteristics of sensor ontology, by combining the life cycle development characteristics of the METHONTOLOGY method, and the advantages of systematic analysis method of the Seven-step process, evaluation optimization method of the Tove method and other ontology building methods, the present invention puts forward a method for PDF Building of sensor ontology which is supportive of demand analysis, conducive to continuous evolution of sensor ontology and capable of effectively reducing domain expert's participation, in accordance with prototyping in software engineering, so as to overcome the defects in the prior art. The method is divided into three phases: Sensor ontology Plan (SoP), Sensor ontology Do and Sensor ontology Feedback. It establishes program plan by object-oriented mode, analyzes implementing results by using existing test data or simulated data, and realizes domain updating and expansion of sensor ontology according to specific applications. The whole development and evolution of sensor ontology is increasing gradually in a spiral form.

To realize the objective above, the present invention adopts the following technical solution: A semantic method for terminal devices of the Internet of Things, capable of analyzing the application characteristics of terminal devices of Internet of Things, setting down the rules for building ontology base; analyzing and building initial ontology base by using the ontology building tool; pre-processing information from network and sensors; collecting information uploaded by sensors, updating the initial ontology base, and expanding the ontology base by collecting information searched by network.

The pre-processing includes ontology parsing and text processing.

The ontology parsing further includes: Parsing the concept information in the initial ontology base to get a set of concepts; parsing instance information in the initial ontology base to get a set of instances; and parsing the relationship information in the initial ontology base to get a set of relationships.

The text processing further includes: Processing web texts and processing collected data texts.

Furthermore, the web text processing includes: Extracting web characteristics after web noise removal.

Furthermore, the collected data text processing includes: Converting data format.

The process of updating the initial ontology base includes:

Performing dynamic data matching and updating the set of instances in the initial ontology base when real-time dynamic measuring values sent by a sensor are collected;

Performing static data matching and updating the set of concepts and the set of relationships in the initial ontology base when intrinsic property information values sent by a sensor are collected.

The process of expanding the initial ontology base includes:

Filtering information searched by network to get network information highly similar to the ontology base;

Calculating the edition distance and context similarity to get information about words having high correlation.

The process of filtering information searched by network further includes:

Suppose the set of domain files in the quantity of n is Set D={D1, D2, . . . Dn}, and cj is any concept in the sensor ontology, then the correlation between file Di and concept cj is:

$$DR(c_j, D_i) = \frac{P(c_j | D_i)}{\sum_{i=1}^{n} P(c_j | D_i)}$$

where, $$P(c_j | D_i) \approx \frac{freq_{t,j}}{\sum_{j=1}^{n} freq_{t,j}}, freq_{t,j}$$

are times of term cj appearing in Di, namely frequency, then the correlation between file Dj and the sensor ontology is:

$$DR_{SenOnt} = \sum_{j=1}^{m} DR(c_j, D_i)$$

m indicates the number of concepts in the sensor ontology;

if the correlation between file Dj and the sensor ontology DRsenont is greater than the correlation coefficient of domain file θ, then the correlation of domain file is high, otherwise the correlation of domain file is low; where the correlation coefficient of domain file θ is the file variable input by users.

The process of calculating the edition distance and context similarity further includes:

Given two words t1 and t2, according to the Sigmoid function as well as edition distance and context similarity, the conceptual matching degree of the two words is:

$$Sim_{concept}(t_1,t_2) = \alpha \cdot Sim_{EditDist}(t_1,t_2) + \beta \cdot Sim_{Context}(t_1,t_2)$$

$$Sim_{concept}(t_1,t_2)$$

where, α, β, adopting the Sigmoid function, is used as coordination factor, $$\alpha = \frac{1}{1 + e^{-Sim_{editDist}(t_1,t_2)}}, \beta = \frac{1}{1 + e^{-Sim_{context}(t_1,t_2)}};$$

if the conceptual matching degree of the two words $Sim_{concept}(t_1,t_2)$ is greater than the correlation coefficient of domain word δ, then the correlation of domain word is high, otherwise the correlation of domain word is low; where the correlation coefficient of domain word δ is the word variable input by users.

The present invention has the following favorable effects and advantages:

1. Making data to have collecting time, place and person, and other related semantic information by means of ontology;

2. Making data to have explicit meaning by means of ontology, establishing unified framework of ontology and ensuring accessibility and reusability of ontology.

DETAILED DESCRIPTION OF THE INVENTION

The present invention is further detailed in combination with the embodiments and the drawings below.

Figure 1:
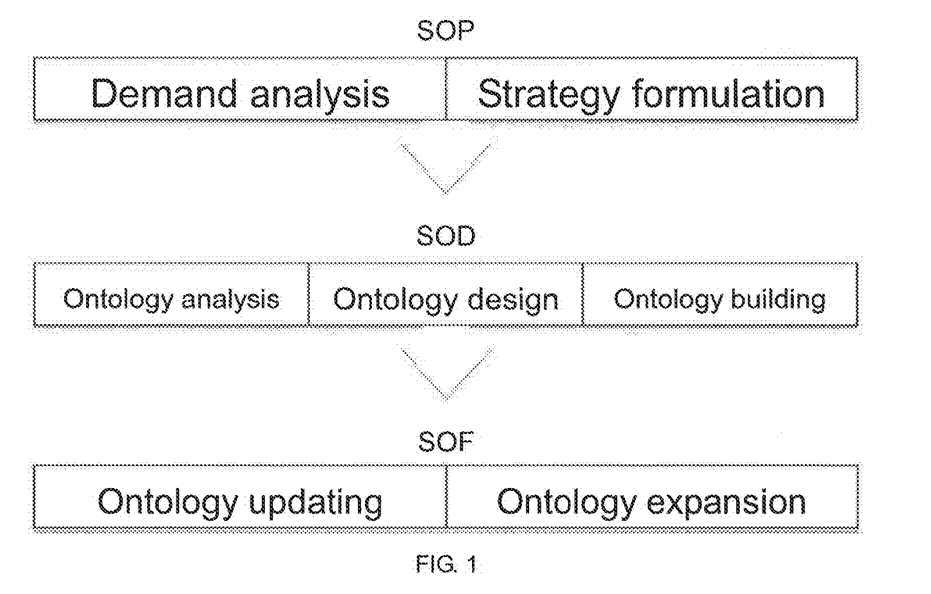
FIG. 1 is the flow chart of Senont-PDF building method of ontology.

On the basis of the building principles of sensor ontology and the characteristics of sensor ontology, by combining the life cycle development characteristics of METHONTOLOGY method, and advantages of systematic analysis method of Seven-step process, evaluation optimization method of the Tove method and other ontology building methods, the present invention puts forward a method for PDF Building of Sensor ontology which is supportive of demand analysis, conducive to continuous evolution of sensor ontology and capable of effectively reducing domain expert's participation, in accordance with prototyping in software engineering. The method is divided into three phases: Sensor ontology Plan (SoP), Sensor ontology Do and Sensor ontology Feedback. The flow chart of building method is as shown in FIG. 1. It establishes program plan by object-oriented mode, analyzes implementing results by using existing test data or simulated data, and realizes domain updating and expansion of sensor ontology according to specific applications. The whole development and evolution of sensor ontology is increasing gradually in a spiral form.

The phase of SoP includes two processes: demand analysis and strategy formulation, accompanied by the whole development of sensor ontology.

Demand analysis: make demand analysis for sensors and application domains, and determine application scope and realization target of sensor ontology, for example, know the underground of sensors and application domains, and clarify the purpose, scope and application of sensor ontology building.

Setting down the rules for building ontology base: Make a full understand of development resources by means of demand analysis, clarify the specific work for ontology development, including information about such as construction target, task assignment, completion time and resource configuration, prepare project management files, ensure the work planned is fulfilled in the mode as designed and guarantee the output of satisfactory products.

The phase of SoD includes three processes: Ontology analysis, ontology design and ontology budding. To have domain experts participation, building an initial sensor ontology, namely realizing the most basic concept of sensors and their observation, and main relationship modeling, is the basis of ontology processing phase.

Ontology analysis: Acquire domain knowledge that is mainly from file information of sensor domain, expert knowledge and reusable ontology. In this phase, it is better to try to enumerate all concepts that system is intended to describe or explain to users.

Ontology design: Organize structure for a high number of domain concepts, build ontology framework or carry out expansion based on the original framework. Evaluate the importance of each concept, select key terms, give explicit definition, group in accordance with corresponding rules and realize ontology modular design.

Ontology building: Firstly, define class and the class hierarchy, wherein the definition of class must be definite and unambiguous, the definition of class hierarchy can be made by downward, upward and combined method according to specific conditions, the class hierarchy is ensured to be "is-a" relation, and it is important to avoid class circulation and ensure one class has 2-12 direct subclass; secondly, define class property and property facets, wherein class property can be hierarchized and defined according to four aspects, that is, intrinsic characteristic, extrinsic characteristic, local and individual dependency, property restrictions and facets are defined according to characteristics of property values, and one property may consist of several facets, including property value type, allowed value, value number and other property value characteristics; finally, ontology realization, namely, describe sensor ontology by formalized language.

The phase of SoF includes two processes: Ontology instance updating and ontology concept expansion. This phase aims at taking the place of manually rewriting ontology base and realizing semi-automatic ontology base updating and expansion.

Ontology updating: On one hand, the sensor is keeping deployment, on the other hand, the data uploaded by the sensor itself are keeping changing, so the ontology base needs to update these data.

Ontology expansion: Because of the limitation of domain knowledge and continuous change of knowledge, the concepts in ontology need to be expanded constantly. We extract related web pages of domain knowledge in network by means of crawler, and calculate the conceptual similarity in web to expand concepts, so as to use these new concepts to expand the ontology base.

1. Ontology Building

Figure 3:
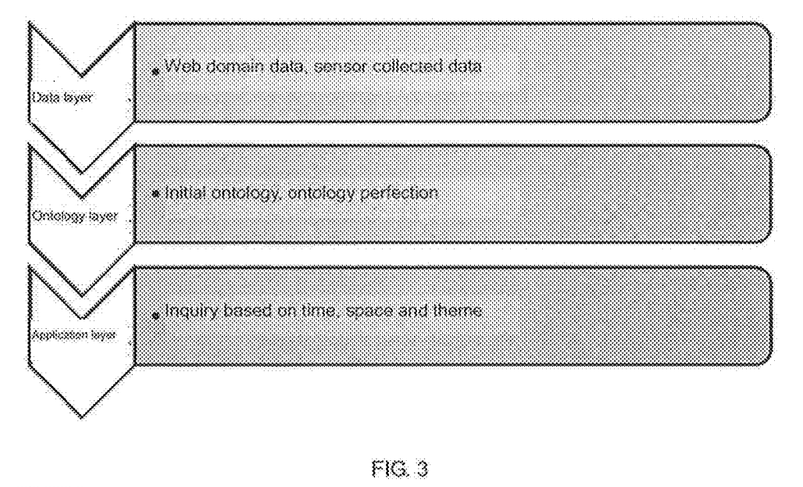
FIG. 3 is the organizational chart of an ontology development tool.

Ontology budding tool: Java is used as system development language, JDK1.6 is used as development tool package, Myeclipse is used as development tool, Oracle is used as data storage tool, OWL is used as ontology language, SPARQL is used as inquiry language, Jena is used as ontology parsing tool, and Protgégé is used as ontology edition tool. The relationship between system functions and tools is as shown in FIG. 3. The system includes three layers from bottom to top: data layer, ontology layer and application layer. Specifically, the data layer is responsible for collecting web concepts and data collected by sensors, the ontology layer enriches and perfects the ontology base of the devices of Internet of Things, and the application layer provides inquiring interfaces.

Figure 2:
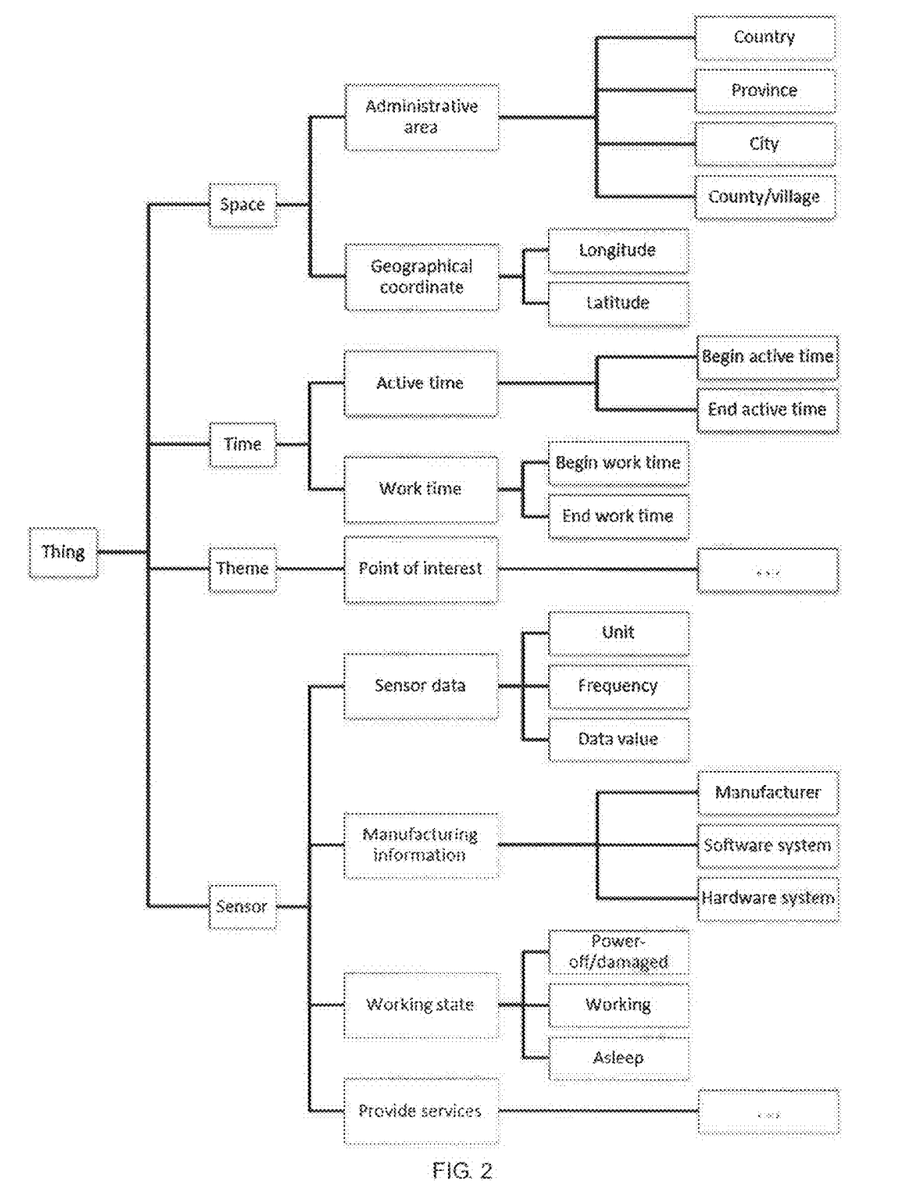
FIG. 2 is the class diagram of ontology for terminal devices of Internet of Things.

For the sensor core ontology, the application scope is the Internet of Things of semantic sensors; the application target is to build a sensor core ontology with excellent expandability and add appropriate classes and individuals according to different application domains; the application characteristics are sensor, sensor characteristic, sensor observation value, observation time, space, theme and corresponding service information; the purpose is to provide sharing conceptual model to sensor and its observation, enrich the semantics of sensor data, and realize sensor discovery based on time, space and theme semantics. Class definition files are prepared by reference to sensor domain ontology and two top ontologies (SuMO ontology and DULCE ontology) as well as national sensor standards, and class hierarchy is built on the basis of ontology design. The hierarchy is as shown in FIG. 2: Four classes in the ontology base, namely sensor, space, time and theme. The sensor class includes four subclasses: sensor data (unit, frequency and value), manufacturing information (manufacturer, software system and hardware system), working states (power-off or damaged, working and asleep) and providing services (added optionally). The space class includes two subclasses: administrative area (country, province, city, county/village) and geographical coordinate (longitude and latitude). The time class includes two subclasses: Active time (begin active time and end active time) and work time (begin work time and end work time). The theme class includes point of interest (added optionally). Wherein, the classes added optionally shall be added in a semi-automatic manner according to specific demands of users.

Figure 4:
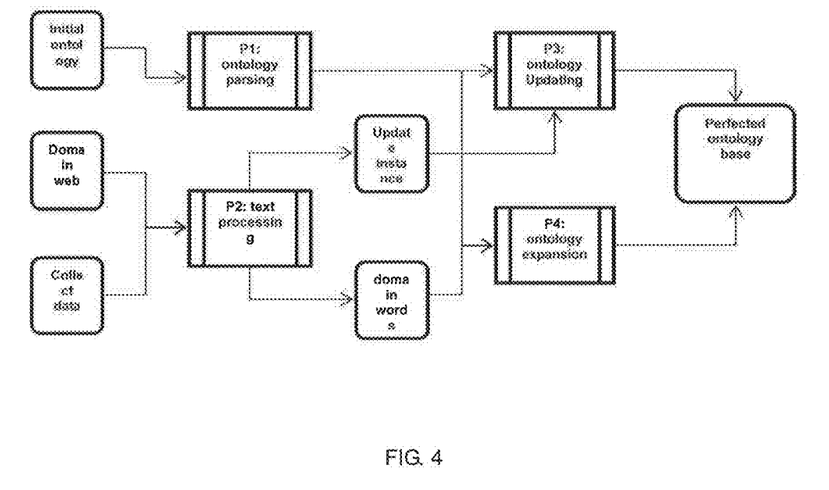
FIG. 4 is the design chart of general module of ontology.

After initial building of ontology, it is required to carry out semi-automatic updating and expansion as well as early-stage pre-processing work. The flow chart of overall design of the ontology base is given hereinafter, as shown in FIG. 4.

2. Pre-Processing

Figure 5:
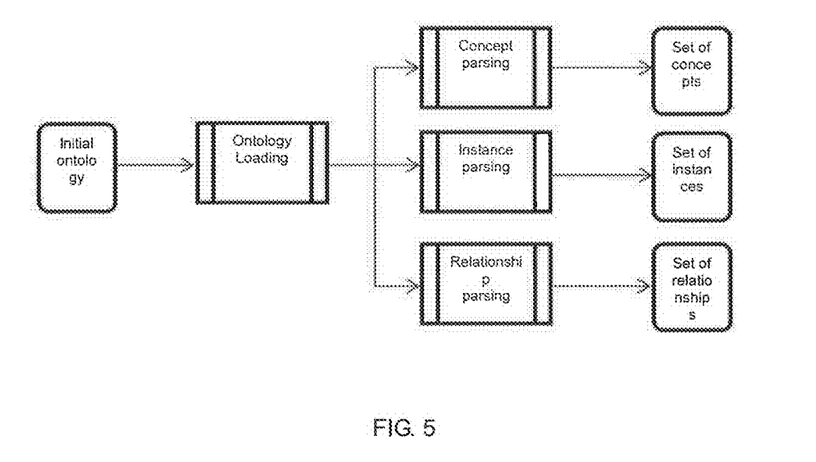
FIG. 5 is the design chart of ontology parsing module.
Figure 6:
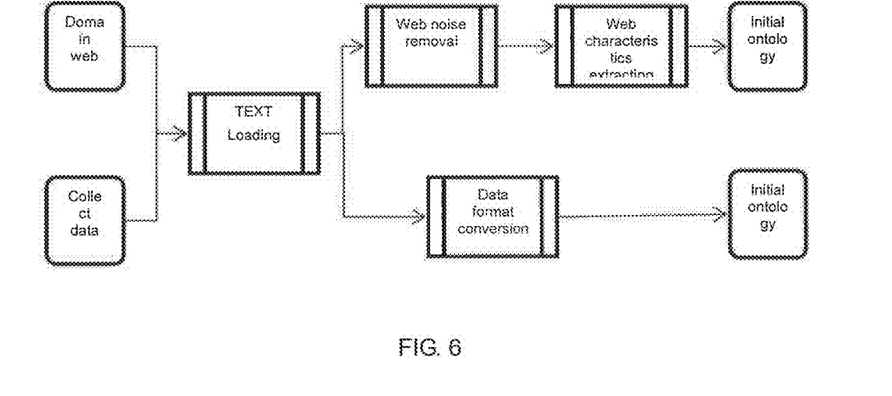
FIG. 6 is the design chart of text processing module.

Pre-processing includes P1 and P2 in the overall flow chart. Wherein, P1 is ontology parsing module that parses the sensor ontology and mainly includes three parts: ontology loading, concept parsing, instance parsing and relationship parsing. This module's processing result is transferred to the sensor ontology updating and expansion module P3, P4 for use, as shown in FIG. 5. P2 is text processing module. The texts to be processed in the system include domain texts and sensor data texts. Text processing mainly includes three submodules: text loading, domain text processing and sensor data processing. The DFD of text processing module is as shown in FIG. 6.

3. Updating

Figure 7:
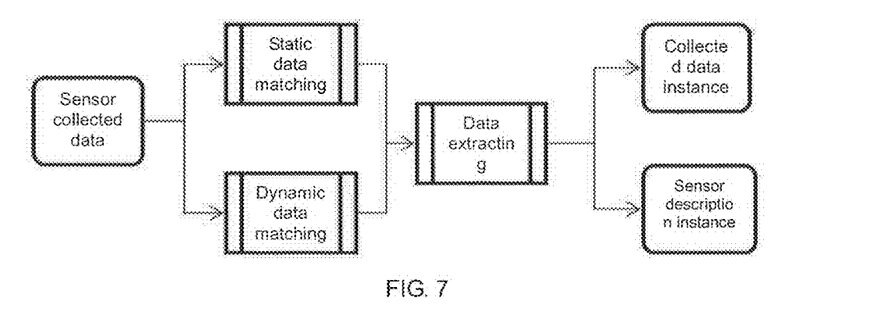
FIG. 7 is the design chart of ontology updating module.

The updating part corresponds to P3 module. The sensor ontology updating means the updating of instances in the class of sensor ontology. According to the real-time and dynamic features of sensor ontology, sensor ontology updating in this document is divided into two types: static instance updating and dynamic instance updating. Static instance updating indicates the addition of instances other than observation values into the sensor ontology. It features long updating period and capability of long-term storage of instances into the sensor ontology. Dynamic instance updating indicates the addition of observation data from sensor into the class of Observation Value of the sensor ontology as a new instance. It features short updating period and removal of instances from ontology at intervals so as to relieve the load on the sensor ontology, as shown in FIG. 7.

Through the sensor observation values actually deployed, real-time data are provided for the instance updating of Observation Value in the sensor ontology in order to drive the instance updating of time, space and theme type and realize updating of the sensor ontology. The main steps are as follows: Firstly, parse the sensor ontology through Jena, acquire the class, relationship and instance of the sensor ontology by means of getelass( ), getRelation( ) and geiIndividual( ), store them to the containers of classList, relationList and individualist defined by this document; secondly, acquire the property corresponding to the database form field where the observation values lie according to the observation values sent by the sensor, find out the concepts requiring instance updating other than observation values in the sensor ontology through conceptMatch( ) function defined by this document, storage the instances to be updated into the updateInstanceList container; afterwards, judge whether the set of instances to be updated are in the sensor ontology through instanceContain( ) function defined by this document, if not in the sensor ontology, update the sensor ontology, vice versa; finally, judge whether there is a relation between the updated instances through isRelation( ) if the answer is yes, carry out relationship assertion through relationAssert( ) function, vice versa.

4. Expansion

Figure 8:
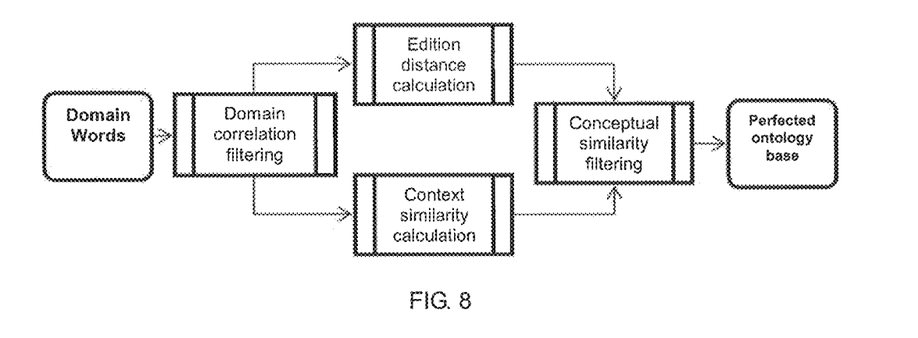
FIG. 8 is the design chart of ontology expanding module.

The expansion part corresponds to P4 module. The ontology expansion is mainly realized by three steps: firstly, compare the ontology base with web information collected via the network by the crawler, and select the web information more relevant to the ontology base according to domain correlation calculation; secondly, calculate the similarity between the concepts in the ontology base and the concepts of the words in the webs obtained in Step 1, to get the words highly similar to the concepts in the ontology base; finally, expand the existing ontology base by using these words so as to achieve semi-automatic expansion of the ontology base, as shown in FIG. 8. To realize semi-automatic expansion of the sensor ontology, the theory of correlation and similarity is introduced. Domain correlation, used to filter domain concepts, indicates the correlation degree between the measuring terms and the specific domains. The basic idea of domain correlation in this document is: taking the concepts in the sensor ontology as the domain terms and obtaining highly correlated files through calculating the correlation between terms and certain file. Similarity, used in many domains such as text classification, ontology mapping, information search and word sense disambiguation, indicates similarity degree of different concepts. It has different meanings in different application domains and uses different calculation methods. The conceptual similarity in this document is employed to realize matching of the concepts in the sensor ontology and the domain terms.

First of all, give the calculation method of domain correlation, suppose the set of domain files in the quantity of n is SetD={D1, D2, ... Dn}, and cj is any concept in the sensor ontology, then the correlation between file Di and concept cj $$DR(c_j, D_i) = \frac{P(c_j|D_i)}{\sum_{i=1}^{n} P(c_j|D_i)}$$

where, $$P(c_j|D_i) \approx \frac{freq_{t,j}}{\sum_{j=1}^{n} freq_{t,j}},$$

$freq_{t,j}$ are times of term cj appearing in Di, namely frequency.

Then the correlation between file Dj and the sensor ontology is:

$$DR_{SenOnt} = \sum_{j=1}^{m} DR(c_j, D_i)$$

m indicates the number of concepts in the sensor ontology; ci indicates the concepts in the ontology.

Afterwards, we make conceptual matching calculation to the domain-related file information. The conceptual matching calculation method is as below; give two terms t1 and t2, according to Sigmoid function as well as edition distance and context similarity, the conceptual matching degree of the two terms is:

$$Sim_{concept}(t_1,t_2)=\alpha \cdot Sim_{EditDist}(t_1,t_2)+\beta \cdot Sim_{Context}(t_1,t_2)$$

where, α, β, adopting Sigmoid function, is used as coordination factor, $$\alpha = \frac{1}{1+e^{-Sim_{EditDist}(t_1,t_2)}}, \beta = \frac{1}{1+e^{-Sim_{context}(t_1,t_2)}}.$$

The edition distance and context similarity calculation function is a commonly used calculation method in information search domain.

What is claimed is:

1. A semantic method for terminal devices of an Internet of Things, comprising:
   analyzing application characteristics of terminal devices of the Internet of Things, setting rules for building an ontology base;
   analyzing and building an initial ontology base using an ontology base building tool;
   pre-processing information from a network and sensors; and
   collecting information uploaded by the sensors, updating the initial ontology base, and expanding the ontology base by collecting information searched by the network,
   wherein expanding the ontology base includes:
     filtering information searched by the network to get network information highly similar to the ontology base;
     calculating edition distance and context similarity to get information about words having a high correlation, and
   wherein filtering information searched by the network further includes:
     suppose a set of domain files in the quantity of n is SetD={D1, D2, ... Dn}, and cj is any concept in sensor ontology, then a correlation between file Di and concept cj is:

$$DR(c_j, D_i) = \frac{P(c_j|D_i)}{\sum_{i=1}^{n} P(c_j|D_i)}$$

where, $$P(c_j|D_i) \approx \frac{freq_{t,j}}{\sum_{j=1}^{n} freq_{t,j}},$$

are times of term cj appearing in Di, namely frequency, then the correlation between file Dj and the sensor ontology is:

$$DR_{SenOnt} = \sum_{j=1}^{m} DR(c_j, D_i)$$

m indicates the number of concepts in the sensor ontology;

if the correlation between file Dj and the sensor ontology $DR_{senont}$ is greater than a correlation coefficient of a domain file θ, then the correlation of the domain file is high, otherwise the correlation of the domain file is low, where the correlation coefficient of the domain file θ is a file variable input by users.

2. The method as claimed in claim 1, wherein the pre-processing includes ontology parsing and text processing.

3. The method as claimed in claim 2, wherein ontology parsing further includes: parsing concept information in the initial ontology base to get a set of concepts; parsing instance information in the initial ontology base to get a set of instances; and parsing relationship information in the initial ontology base to get a set of relationships.

4. The method as claimed in claim 3, wherein updating the initial ontology base includes:
performing dynamic data matching and updating the set of instances in the initial ontology base when real-time dynamic measuring values sent by a sensor are collected;
performing static data matching and updating the set of concepts and the set of relationships in the initial ontology base when intrinsic property information values sent by a sensor are collected.

5. The method as claimed in claim 2, wherein text processing further includes: processing web texts and processing collected data texts.

6. The method as claimed in claim 5, further comprising: extracting web characteristics after web noise removal.

7. The method as claimed in claim 5, wherein collected data text processing includes converting data format.

8. The method as claimed in claim 1, wherein calculating the edition distance and context similarity further includes:
given two words t1 and t2, according to a Sigmoid function as well as edition distance and context similarity, a conceptual matching degree of the two words is:

$$Sim_{concept}(t_1,t_2) = \alpha \cdot Sim_{EditDist}(t_1,t_2) + \beta \cdot Sim_{Context}(t_1,t_2)$$

$$Sim_{concept}(t_1,t_2)$$

where, α, β, adopting the Sigmoid function, is used as coordination factor, $$\alpha = \frac{1}{1+e^{-Sim_{editDist}(t_1,t_2)}}, \beta = \frac{1}{1+e^{-Sim_{context}(t_1,t_2)}};$$

if the conceptual matching degree of the two words $Sim_{concept}(t_1,t_2)$ is greater than a correlation coefficient of a domain word δ, then the correlation of the domain word is high, otherwise the correlation of the domain word is low;

where the correlation coefficient of the domain word δ is a word variable input by users.

9. A semantic method for terminal devices of an Internet of Things, comprising:
analyzing application characteristics of terminal devices of the Internet of Things, setting rules for building an ontology base;
analyzing and building an initial ontology base using an ontology base building tool;
pre-processing information from a network and sensors; and
collecting information uploaded by the sensors, updating the initial ontology base, and expanding the ontology base by collecting information searched by the network,
wherein expanding includes:
filtering information searched by the network to get network information highly similar to the ontology base;
calculating edition distance and context similarity to get information about words having a high correlation, and
wherein calculating the edition distance and context similarity further includes:
given two words t1 and t2, according to a Sigmoid function as well as edition distance and context similarity, a conceptual matching degree of the two words is:

$$Sim_{concept}(t_1,t_2) = \alpha \cdot Sim_{EditDist}(t_1,t_2) + \beta \cdot Sim_{Context}(t_1,t_2)$$

$$Sim_{concept}(t_1,t_2)$$

where, α, β, adopting the Sigmoid function, is used as coordination factor, $$\alpha = \frac{1}{1+e^{-Sim_{editDist}(t_1,t_2)}},$$

$$\beta = \frac{1}{1+e^{-Sim_{context}(t_1,t_2)}};$$

if the conceptual matching degree of the two words $Sim_{concept}(t_1,t_2)$ is greater than a correlation coefficient of a domain word δ, then the correlation of the domain word is high, otherwise the correlation of the domain word is low;

where the correlation coefficient of the domain word δ is a word variable input by users.

10. The method as claimed in claim 9, wherein the pre-processing includes ontology parsing and text processing.

11. The method as claimed in claim 10, wherein ontology parsing further includes: parsing concept information in the initial ontology base to get a set of concepts; parsing instance information in the initial ontology base to get a set of instances; and parsing relationship information in the initial ontology base to get a set of relationships.

12. The method as claimed in claim 11, wherein updating the initial ontology base includes:
performing dynamic data matching and updating the set of instances in the initial ontology base when real-time dynamic measuring values sent by a sensor are collected;
performing static data matching and updating the set of concepts and the set of relationships in the initial ontology base when intrinsic property information values sent by a sensor are collected.

13. The method as claimed in claim 10, wherein text processing further includes: processing web texts and processing collected data texts.

14. The method as claimed in claim 13, further comprising:
extracting web characteristics after web noise removal.

15. The method as claimed in claim 13, wherein collected data text processing includes converting data format.

16. The method as claimed in claim 9, wherein filtering information searched by the network further includes:
suppose a set of domain files in the quantity of n is SetD={D1, D2, . . . Dn}, and cj is any concept in sensor ontology, then a correlation between file Di and concept cj is:

$$DR(c_j, D_i) = \frac{P(c_j | D_i)}{\sum_{i=1}^{n} P(c_j | D_j)}$$

where, $$P(c_j | D_i) \approx \frac{freq_{t,j}}{\sum_{j=1}^{n} freq_{t,j}} \quad freq_{t,j}$$

are times of term cj appearing in Di, namely frequency,
then the correlation between file Dj and the sensor ontology is:

$$DR_{SenOnt} = \sum_{j=1}^{m} DR(c_j, D_i)$$

m indicates the number of concepts in the sensor ontology;
if the correlation between file Dj and the sensor ontology $DR_{senont}$ is greater than a correlation coefficient of a domain file θ, then the correlation of the domain file is high, otherwise the correlation of the domain file is low;
where the correlation coefficient of the domain file θ is a file variable input by users.

* * * * *